United States Patent [19]

Sommer

[11] Patent Number: 4,521,361

[45] Date of Patent: Jun. 4, 1985

[54] AQUEOUS PLASTIC MOLDING COMPOSITIONS BASED ON CERAMIC RAW MATERIALS CONTAINING AIR-DRYING AND SINTERABLE ADDITIVES

[75] Inventor: Werner Sommer, Bad Soden, Fed. Rep. of Germany

[73] Assignee: T+F Kunststuffe fur Tecknik und Freizeit GmbH, Dreieich, Fed. Rep. of Germany

[21] Appl. No.: 518,829

[22] Filed: Aug. 1, 1983

Related U.S. Application Data

[63] Continuation of Ser. No. 343,542, Jan. 28, 1982, abandoned.

[30] Foreign Application Priority Data

Feb. 4, 1981 [DE] Fed. Rep. of Germany ....... 3103813

[51] Int. Cl.$^3$ ............................ B27J 5/00; D04H 1/54
[52] U.S. Cl. ................................... 264/126; 264/123; 524/5; 524/446; 524/4; 524/8
[58] Field of Search ............................ 524/5, 446, 4, 8

[56] References Cited

U.S. PATENT DOCUMENTS 3,640,912  2/1972  Reinhard et al. ................. 524/5
4,265,794  5/1981  Pett et al. ....................... 264/126

FOREIGN PATENT DOCUMENTS 2021085  11/1970  Fed. Rep. of Germany.
2040795  2/1971  Fed. Rep. of Germany.

*Primary Examiner*—Joseph L. Schofer
*Assistant Examiner*—N. Sarofim
*Attorney, Agent, or Firm*—Collard, Roe & Galgano

[57] ABSTRACT

Aqueous plastic molding compositions based on ceramic raw materials characterized by containing a dual binder system consisting of water-soluble and/or water-dispersed air-drying high molecular weight film-forming agents, as well as of water-insoluble thermoplasts of fine particle form sinterable at temperatures below 250° C. and a method of producing molded articles using the said compositions are disclosed.

3 Claims, No Drawings

AQUEOUS PLASTIC MOLDING COMPOSITIONS BASED ON CERAMIC RAW MATERIALS CONTAINING AIR-DRYING AND SINTERABLE ADDITIVES

This application is a continuation of application Ser. No. 343,542 filed Jan. 28, 1982, now abandoned.

The industrial production of ceramic products generally involves the use of binder-free clay or porcelain compositions having a moisture content of from 20 to 40% by weight and is characterized by excellent plasticity and considerable form retaining ability. Experience indicates that such compositions are readily moldable, may be modelled by simple means and lend themselves to versatile artistic designs. Shaped parts produced therefrom, after being dried, are of poor strength, tend to break upon impact, swell significantly in water and, therefore, must be baked at temperatures of from 900° 1400° C. The compulsory burning process is of no difficulty to industrial plants and pottery works as they have the special baking ovens necessary.

In recent years there has been an increasing tendency to work with ceramic materials outside the industrial area. However, access has been prohibited to a great number of interested persons because of the lack of baking or burning facilities.

It is therefore the object of the invention to fill this gap by means of the claimed ceramic compositions sinterable at temperatures below 250° C. which compositions show favourable premises in so far as the usual domestic baking ovens are sufficient for tempering. Nursery school education, craftwork and art education or hobbies can be expected to receive new impulses.

Molding compositions, known from present prior art as described in the published German Offenlegungsschrift No. 25 15 757 and Augslegeschrift No. 29 37 843, composed of thermosetting plastics preparations, are of the type of dispersions of pastable poly vinyl chloride in liquid plasticizers which gel on heating. Higher curing levels can be obtained by adding polymerizable vinyl compounds, acrylic acid esters and unsaturated polyester resins. All of the above described products contain a maximum of 10% by weight of inorganic substances, especially naturally occurring silicates, highly dispersed silicic acids or aluminium hydroxides having a great specific surface area, providing said mixtures with thixotropy necessary for forming moldable plastigels and eliminating their stickiness. The claimed ceramic compositions predominantly composed of mineral raw materials and containing binders, and significantly different from said plastigels. In lieu of the essentially nonvolatile plasticizers they contain water as the external phase, in which the primary component of said dual binder system is dissolved or dispersed. Already during drying at room temperature the high molecular weight film forming agents perform a solidifying action. In the solid phase, expanding clays and purified magnesium montmorillonites assist in providing a suspension of said secondary components, consisting of thermoplasts of fine particle size, initially functioning as an opening material and later, sintering upon tempering. It is beneficial that, especially for the technically interesting melting point range between 100° and 250° C., numerous generally physiologically recognized as safe polymers free of plasticizers, are available and the dependence on pastable poly vinyl chloride and plasticizers is avoided. Plastigels are highly appreciated as kneadable and modelling compositions, unsuited, however, for processing on a potter's wheel or for ceramic construction. Shaped parts made of plastigels visually do not produce a typical ceramic impression.

German Offenlegungsschrift No. 20 40 795 (E. I. Du Pont de Nemous and Co.) discloses ceramic compositions and articles made therefrom. These compositions are slurry-like fluids and contain an aqueous dispersion of an internally plasticized, heat-curing resin binder. They serve to provide storable ceramic plates having flexibility, and to produce baked ceramic substrates for the electronic field they must be baked at high temperatures, e.g. 1650° C. Such compositions, therefore, are not suited for the purposes of the present invention.

German Offenlegungsschrift No. 20 21 085 (Mattel, Inc.) discloses a cold setting clay comprising a styrene-butadiene latex as a binder. However, experiments show an insufficient water-resistance, probably because of its emulsifier content.

It is therefore the object of this invention to provide water-containing plastic molding compositions which predominantly consist of fine particulate minerals and contain a dual binder system. The rheological behaviour of preparations according to the invention, shows the characteristic of conventional binder-free ceramic compositions. Primarily said binder system comprises water-soluble, water-dispersible or re-dispersible high molecular weight substances capable of film-forming at room temperature; secondarily it is composed of water-insoluble powdery, farina-like or fibrillar thermoplasts having a softening temperature in the range of 60° C. to 250° C.

The purpose of the said film-forming substances of the binder system described above is to provide the objects made of said molding composition with a certain consistency and firmness already during the drying period, and furthermore to make them shock resistant and to eliminate the risk of cracking. Said thermoplasts used in the binder system as the second component are adjusted such that the temperature necessary for sintering corresponds to the capacity of usual domestic baking ovens. For working with ceramic molding compositions outside the industrial area, new aspects result in so far as the installation of expensive baking apparatus is avoided. Sintering results in fusing together (coalescing) adjacent mineral and organic particles contained in the dried shaped parts which is of noticeable benefit with respect to strength and water resistance.

Clays, kaolin, quartz, fluorite and pulverized grogs may be used as said mineral raw or starting materials. Though the composition of the mineral mixture is not the subject matter of this invention, it should be noted that considerable variation in quality results from using materials of differing origin. Of course, particle size and particle size distribution play their part in having an effect on the rheological behaviour. Bentonites promote gelling and function as suspending aids for farina-like thermoplasts.

High molecular weight substances capable of film-forming at ambient temperature are available in such numbers that it is appropriate to consider here only the relevant ones. Among water-soluble products primarily cellulose ethers, poly vinyl alcohols and poly vinyl pyrrolidones are to be considered. Weak base adjustments of the aqueous phase by means of ammonia, allow for the application of vinyl acetate copolymers and poly acrylates having carboxylic groups, thereby resulting in films which scarcely swell in water. Film-forming agents available in the form of an aqueous dispersion or as re-dispersible dispersion powder also provide beneficial qualities with respect to the water resistance of films resulting therefrom. Poly vinyl acetate, ethylene-vinyl acetate-copolymers, poly vinyl propionate and polyacrylates are the basis of these products.

Thermoplasts having melting temperatures ranging from 60° C. to 250° C. are principally suited as said secondary component for the dual binder system; however, for obvious reasons, again, only preferred polymers are mentioned. These are poly ethylene, poly propylene, poly acrylates, poly styrene, poly amides, ethylene-vinyl acetate- and ethylene-acrylic acid ester copolymers. If the film-forming substance and sinterable polymer have similar constitutions a synergistic effect will result.

According to the invention the proportion of mineral to organic components of the molding compositions on a dry substance base, at the lower limit amounts to 95/5 and at the upper limit to 60/40. If the minimum content of binder is not attained the result will be decreased stength; if, however, the binder content is increased beyond the upper level, the finished shaped parts will lose the typically ceramic appearance. The water content of said molding compositions is between 20 and 40% by weight.

For the production of plastic molding compositions according to this invention, a powerful kneader or planetary paddle mixer will be necessary. All solids of a production batch are fed into the mixer and dry-blended. The amount of water necessary for the charge is then added gradually. After a mixing period of about 20 minutes the result will be a homogeneous plastic molding composition. It has proven useful to premix water-soluble film-forming agents and aqueous synthetic resin dispersions in an agitator with the entire amount of water of one charge.

The constituents of said molding compositions are given in the following examples to clarify comparisons not on a percent basis but uniformly based on 100 parts by weight of different mineral substances:

EXAMPLE 1

|  | Parts by weight |
| --- | --- |
| Rich clay, powdered | 70 |
| Lean clay, powdered | 30 |
| Polyethylene powder | 7 |
| Polyethylene fibers | 3 |
| Ethylene-vinyl acetate-copolymer (re-dispersible dispersion powder) | 5 |
| Water | 50 |
| Carboxymethyl cellulose | 2 |

EXAMPLE 2

|  | Parts by weight |
| --- | --- |
| Rich clay, powdered | 50 |
| Quartz powder | 30 |
| Bentonite | 20 |
| Poly ethylene powder | 15 |
| Vinyl acetate-copolymer containing carboxylic groups, 50% solution in water/spirit, made alkaline with ammonia | 5 |
| EVA dispersion, 50% | 5 |
| Water | 35 |

EXAMPLE 3

|  | Parts by weight |
| --- | --- |
| Rich clay, powdered | 50 |
| Kaolin (china clay) | 20 |
| Quartz powder | 20 |
| Lean clay, powdered | 10 |
| Poly ethylene powder | 30 |
| EVA dispersion, 50% | 10 |
| Water | 45 |
| Carboxymethyl cellulose | 2 |

EXAMPLE 4

|  | Parts by weight |
| --- | --- |
| Rich clay, powdered | 60 |
| Quartz powder | 30 |
| Lean clay, powdered | 10 |
| Poly acrylate, farina-like | 20 |
| Poly acrylate dispersion, 50% | 10 |
| Water | 30 |

EXAMPLE 5

|  | Parts by weight |
| --- | --- |
| Rich clay, powdered | 60 |
| Quartz powder | 30 |
| Lean clay, powdered | 10 |
| Poly styrene, farina-like | 20 |
| Acrylonitrile-butadiene-styrene, 50% aqueous dispersion | 10 |
| Water | 30 |

EXAMPLE 6

|  | Parts by weight |
| --- | --- |
| Rich clay, powdered | 50 |
| Quartz powder | 30 |
| Bentonite | 20 |
| Poly amide powder | 35 |
| Poly isobutylene dispersion, 50% | 10 |
| Water | 25 |

EXAMPLE 7

|  | Parts by weight |
| --- | --- |
| Rich clay, powdered | 50 |
| Quartz powder | 30 |
| Kaolin (china clay) | 20 |
| Poly propylene powder | 40 |
| Poly isobutylene dispersion, 50% | 10 |
| Water | 30 |

As the examples demonstrate the dual binder system is characterized by its variability.

What is claimed is:

1. An aqueous plastic molding composition based on more than 50% of mineral ceramic raw materials and a binder having less than 5% binder polymer present in the form of an aqueous dispersion or solution of organic resin the remainder being sinterable thermoplast and water:

said binder including a dual system including a first member selected from the group consisting of water-soluble, high molecular weight, film-forming agents, and water-dispersed, air-drying high molecular weight, film-forming agents, and a second member comprising water-insoluble thermoplasts of fine particulate form sinterable at temperatures below 250° C., and wherein the ratio of said mineral materials to said organic resin on a dry substance base is in the range of about from about 95:5 to about 60:40 by weight.

2. The aqueous plastic molding composition as claimed in claim 1, wherein said ratio of said mineral materials to said organic resin is in the range from about 100:6 to about 100:60.

3. In a method of producing a molded article from an aqueous plastic moldable composition based on more than 50% of mineral ceramic raw materials and a binder having less than 5% binder polymer present in the form of an aqueous dispersion or solution of organic resin the remainder being sinterable thermoplast and water, said binder including a dual binder system including a first member selected from the group consisting of water-soluble, high molecular weight, film-forming agents, water-dispersed, and air-drying, high molecular weight, film-forming agents and a second member comprising water-insoluble thermoplasts of fine particulate form sinterable at temperatures below 250° C., the steps comprising:

selecting the ratio of said mineral materials to said organic resin on a dry substance base in the range from about 95:5 to about 60:40 by weight;

molding said composition to a desired shape;

allowing the molded composition to dry at least at a normal ambient temperature; and thereafter sintering the molded compostion at a temperature up to a maximum temperature of about 250° C.

* * * * *